(12) United States Patent
Lee et al.

(10) Patent No.: US 7,864,514 B2
(45) Date of Patent: Jan. 4, 2011

(54) DISPLAY DEVICE

(75) Inventors: Jeong Roh Lee, Suwon-si (KR); Jun Su Jung, Suwon-si (KR); Jin Sung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 12/165,763

(22) Filed: Jul. 1, 2008

(65) Prior Publication Data

US 2009/0091881 A1      Apr. 9, 2009

(30) Foreign Application Priority Data

Oct. 9, 2007      (KR) ...................... 10-2007-0101224

(51) Int. Cl.
  *G06F 1/16*      (2006.01)
(52) U.S. Cl. .................. 361/679.21; 345/206; 362/225; 248/602
(58) Field of Classification Search .................. 345/1.1, 345/206; 361/679.02, 679.07, 679.09, 679.21, 361/679.22, 679.27; 362/97.1, 125, 225; 349/58, 153, 187; 248/419, 157, 432, 602; 200/314

See application file for complete search history.

(56) References Cited

U.S. PATENT DOCUMENTS

| 2003/0095373 | A1* | 5/2003 | Duquette | ..................... | 361/681 |
| 2006/0214871 | A1* | 9/2006 | Iwamura | ..................... | 345/1.1 |
| 2007/0247798 | A1* | 10/2007 | Scott | ........................... | 361/683 |

FOREIGN PATENT DOCUMENTS

| JP | 2002-165157 | 6/2002 |
| KR | 2006-134558 | 12/2006 |

OTHER PUBLICATIONS

Chinese Office Action issued May 7, 2010 in CN Application No. 200810215465.3.

\* cited by examiner

*Primary Examiner*—Hung V Duong
(74) *Attorney, Agent, or Firm*—Stanzione & Kim, LLP

(57) ABSTRACT

A display device allows an auxiliary unit, such as a sub display panel or a memo clip, to be easily mounted by a user to or separated from the display device. The display device includes a display panel, a support unit to support the display panel, and at least one coupling groove formed at an edge of the display panel to allow at least one auxiliary unit to be mounted to or separated from the display panel.

18 Claims, 7 Drawing Sheets

DISPLAY DEVICE

CROSS-REFERENCE TO RELATED APPLICATIONS

This application claims the benefit and priority under 35 U.S.C. §119(a) of Korean Patent Application No. 2007-101224, filed on Oct. 9, 2007 in the Korean Intellectual Property Office, the disclosure of which is incorporated herein by reference in its entirety.

BACKGROUND OF THE INVENTION

1. Field of the Invention

The present general inventive concept relates to a display device, and more particularly, to a display device including a sub display panel or a memo clip mounted to the edge of the display device.

2. Description of the Related Art

Computer users frequently chat with other people or watch motion pictures while performing Internet surfing or word processing. However, it is difficult to display a lot of such information through one display device. For this reason, the number of users constructing a multi display system including a plurality of display devices connected to one computer has increased recently. In the multi display system, a mouse cursor and programs can freely move between the display devices, and therefore, it is convenient to simultaneously perform several tasks using the plurality of display devices.

A conventional display device includes a main display panel, a receiving space provided at the rear of the main display panel, and a sub display panel received in the receiving space. In the receiving space is mounted a guide unit to move the sub display panel vertically or laterally. The display device may be used while the sub display panel is received in the receiving space or is located at the top or the side of the main display panel, as needed. The sub display panel has to be coupled to an inside structure of the main display panel before the main display panel is assembled.

In the above-described conventional display device, however, the sub display panel is received in the receiving space of the main display panel, with the result that the thickness of the display device is great, and the structure of the conventional display device is complicated. Also, the sub display panel simply moves vertically to the top of the main display panel or laterally to the side of the main display panel in a sliding fashion, with the result that it is difficult to adjust the screen angle of the sub display panel.

SUMMARY OF THE INVENTION

The present general inventive concept provides a display device that allows a sub display panel to be easily mounted to or separated from the display device as needed and allows the screen angle of the sub display panel to be easily adjusted.

The present general inventive concept also provides a display device that allows an auxiliary unit for a user's convenience, in addition to the sub display panel, to be easily mounted to or separated from a main display panel.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a display device including a display panel, a support unit to support the display panel, and at least one coupling groove formed at an edge of the display panel to allow at least one auxiliary unit to be mounted to or separated from the display panel.

The coupling groove may extend along the edge of the display panel such that the auxiliary unit can move in a longitudinal direction, and the coupling groove has an opening width less than an interior width.

The coupling groove may extend along top and side edges of the display panel such that the auxiliary unit can move in the longitudinal direction, and the display device may further include a connection member having at least one magnet embedded therein, the connection member being attached to the coupling groove, and a magnetic member mounted to the edge of the display panel such that the connection member can be attached to the display panel via the magnetic member.

The coupling groove may be formed in the sectional shape of an arc. The connection member may be formed in the shape of a cylinder, whereby the auxiliary unit may be mounted to the display panel such that an angular position of the auxiliary unit can be adjusted.

The connection member may be integrally formed at a side of the auxiliary unit.

The foregoing and/or other aspects and utilities of the present general inventive concept may also be achieved by providing a display device including a main display panel, a support unit to support the main display panel, a sub display panel mounted to an edge of the main display panel, and a coupling unit to allow the sub display panel to be coupled to the main display panel, such that the sub display panel can move linearly and an angular position of the sub display panel can be adjusted, and to allow the sub display panel to be separated from the main display panel, wherein the coupling unit includes at least one coupling groove formed at least one edge of the main display panel and a connector provided at the at least one edge of the sub display panel such that the connector is fitted within the coupling groove.

The coupling groove may extend along top and side edges of the main display panel, coupling groove having an opening width less than an interior width, and the connector is formed having an external shape corresponding to a shape of the coupling groove, the connector extending along an edge of the sub display panel such that the sub display panel can move in a longitudinal direction of the coupling groove.

The foregoing and/or other aspects and utilities of the present general inventive concept may also be achieved by providing a display device including a main display panel, a support unit to support the main display panel, a sub display panel mounted to an edge of the main display panel, and a coupling unit to allow the sub display panel to be coupled to and separated from the main display panel, wherein the coupling unit includes a first coupling groove extending along the edge of the main display panel, a second coupling groove extending along an edge of the sub display panel, and at least one connection member coupled to the first and second coupling grooves by a magnetic force.

The display device may further include a connection member having at least one magnet embedded therein, and a magnetic member mounted to the first and second coupling grooves, whereby the connection member is coupled to the first and second coupling grooves.

At least one of the first and second coupling grooves may have a depth less than the radius of the connection member.

The foregoing and/or other aspects and utilities of the present general inventive concept may also be achieved by providing a display device including a display panel, and a coupling groove formed on an edge of the display panel to be coupled to an external auxiliary unit.

The coupling groove may be formed on an exterior surface of the display panel.

The external auxiliary unit may not be coupled to a structure disposed inside of the display panel.

The external auxiliary unit may be rotatable with respect to the display panel and is connected to the coupling groove without dissembling the display panel.

The external auxiliary unit may be connected to the coupling groove after assembling the display panel.

The display device may further include an entrance and/or exit portion formed in the coupling groove such that the auxiliary unit is coupled to or decoupled from the display panel through the entrance and/or exit portion The display device may further include a first circuit disposed in the display panel, a second circuit disposed in the auxiliary unit, and a connector to connect the first circuit and the second circuit.

The foregoing and/or other aspects and utilities of the present general inventive concept may also be achieved by providing a main display panel, and an auxiliary unit rotatably coupled to an outer portion of the perimeter of the main display panel such that the auxiliary unit is also linearly moveable along the outer portion of the perimeter of the main display panel.

The auxiliary unit may be a sub display panel.

The auxiliary unit may be a memo clip.

The auxiliary unit may be magnetically coupled to the main display panel.

The display device may further include a connector disposed on an outer portion of the perimeter of the auxiliary unit to rotatably couple to a coupling groove formed on the outer portion of the perimeter of the main display panel.

The display device may further include a connection member disposed between a first coupling groove formed on the outer portion of the perimeter of the main display panel and a second coupling groove formed on an outer portion of the perimeter of the auxiliary unit to rotatably couple the main display panel to the auxiliary unit.

The main display panel and the auxiliary unit may be magnetically coupled to the connection member.

BRIEF DESCRIPTION OF THE DRAWINGS

These and/or other aspects and advantages of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
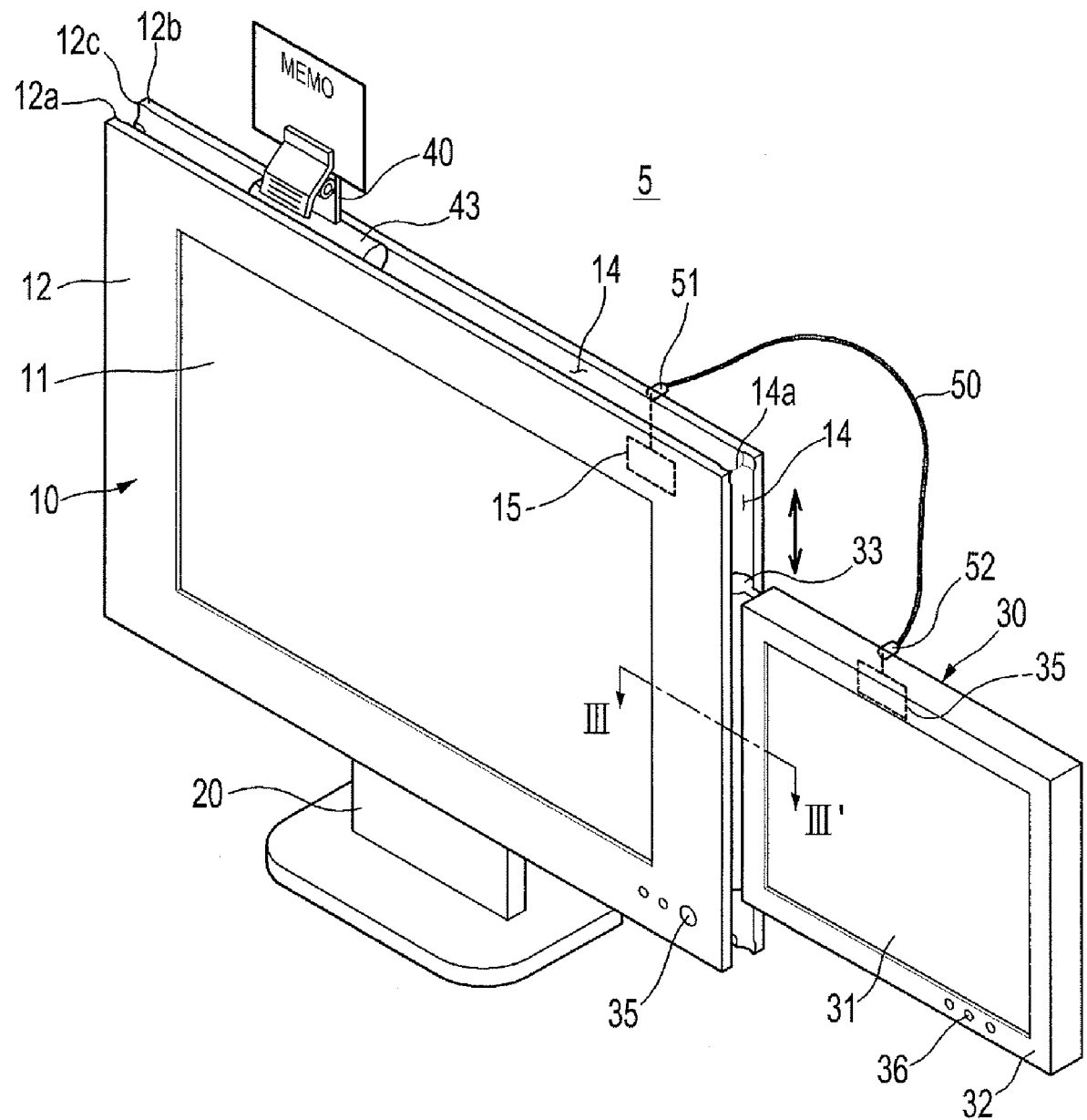
FIG. 1 is a perspective view illustrating a display device according to an embodiment of the present general inventive concept.

Reference will now be made in detail to the embodiment of the present general inventive concept, examples of which are illustrated in the accompanying drawings, wherein like reference numerals refer to like elements throughout. The embodiments are described below to explain the present general inventive concept by referring to the figures.

Figure 2:
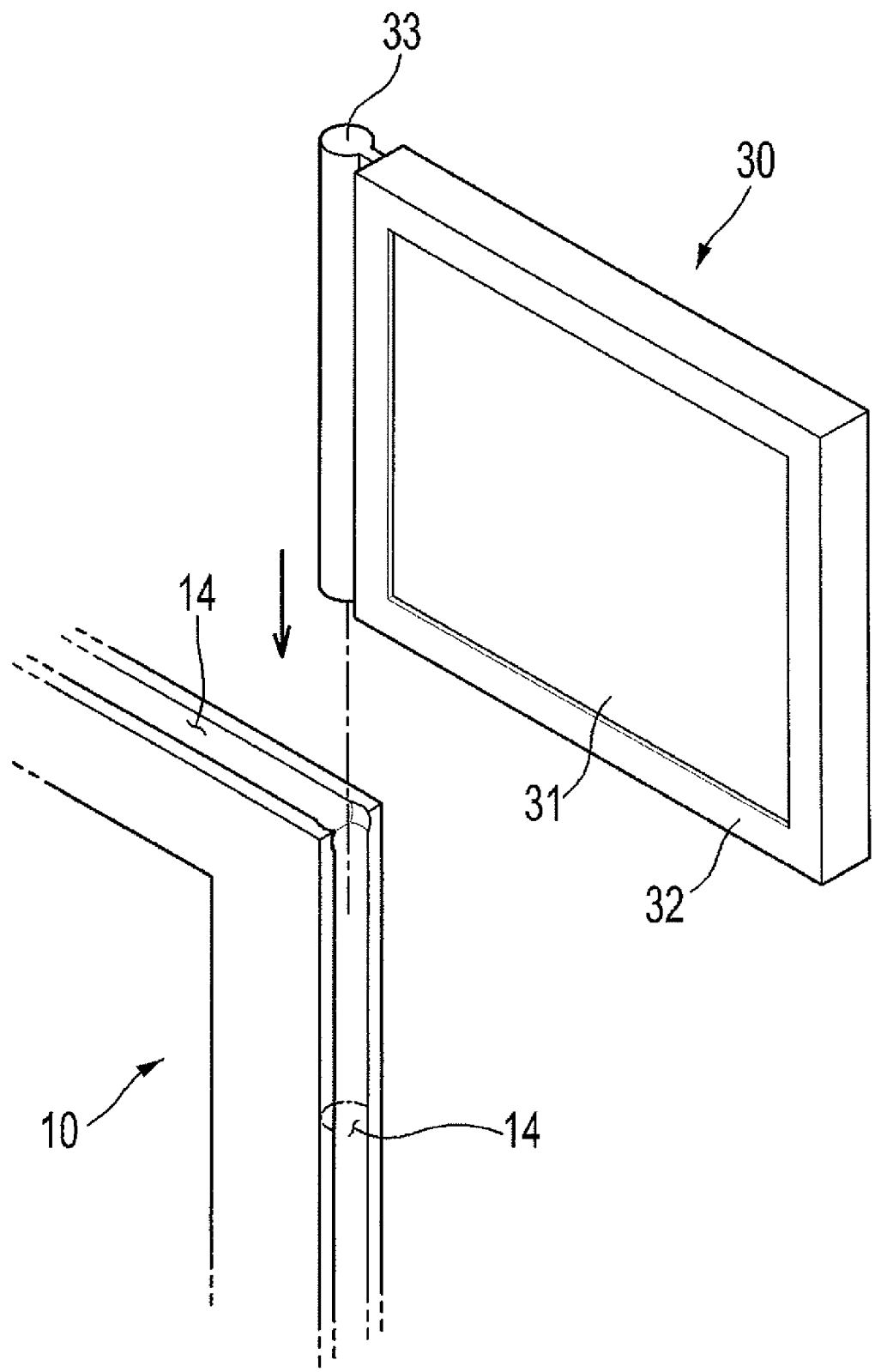
FIG. 2 is a perspective view illustrating coupling between a main display panel and a sub display panel of the display device according to an embodiment of the present general inventive concept.
Figure 3:
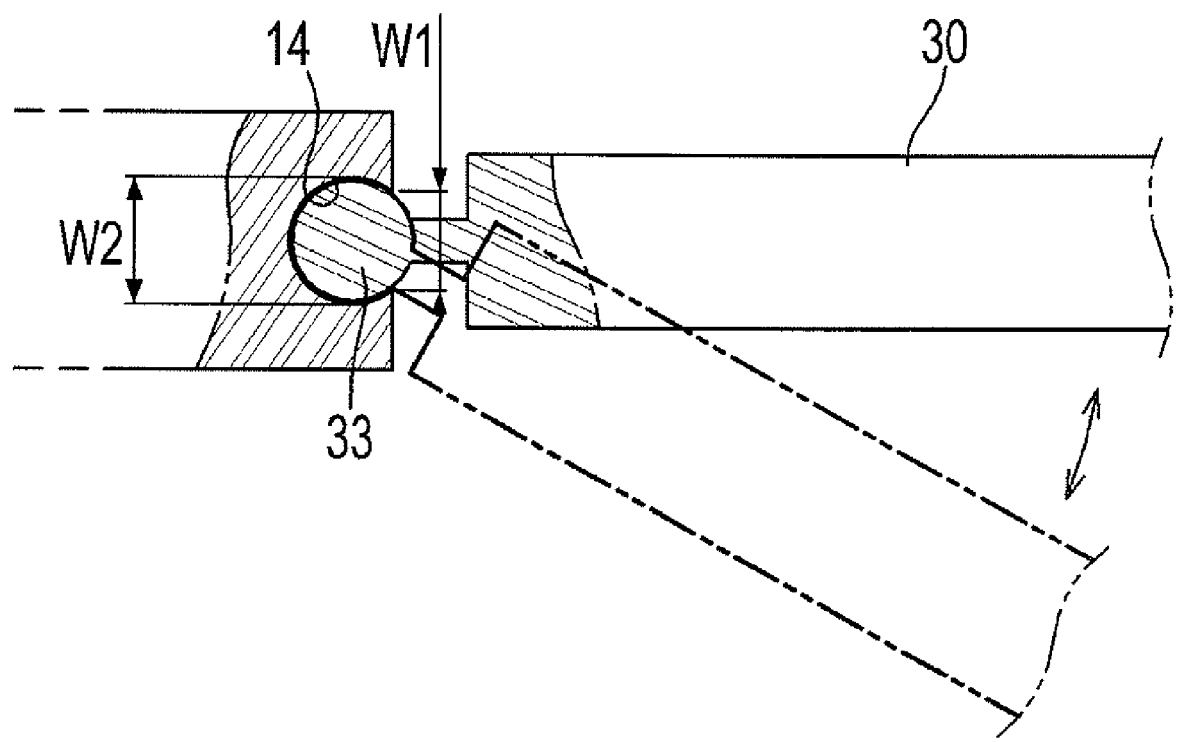
FIG. 3 is a sectional view taken along line III-III' of the display device of FIG. 1.

FIGS. 1 through 3 illustrate a display device 5 according to an embodiment of the present general inventive concept. As illustrated in FIG. 1, the display device 5 includes a main display panel 10, a support unit 20 to support the main display panel 10, and a sub display panel 30 that can be mounted to, or separated from, the main display panel 10, as needed.

The main display panel 10 includes a display module 11 to display an image and a case 12 that covers the front, top and rear of the outer perimeter of the display module 11 to protect the display module 11. Similarly, the sub display panel 30 includes a display module 31 to display an image and a case 32 to protect the display module 31. The case 31 covers the front, top and rear of the outer perimeter of the display module 31 to protect the display module 31.

The support unit 20 is coupled to the rear or the bottom of the main display panel 10 to maintain the erect state of the main display panel 10. The support unit 20 may be rotatably connected to the main display panel 10, by a rotatable hinge unit (not illustrated), to adjust the screen angle of the main display panel 10.

To an outer edge of the perimeter of the case 12 of the main display panel 10 may be mounted one or more auxiliary units, such as a memo clip 40 or the sub display panel 30, to provide users with ease and convenience of use of the display device 5. To this end, a coupling groove 14, in which the one or more auxiliary units are coupled, is formed at the outer edge of the perimeter of the case 12 of the main display panel 10. The coupling groove 14 may extend along the top and both side edges of the main display panel 10.

As illustrated in FIG. 3, the coupling groove 14 may be formed in the sectional shape of an arc, but may also be formed in a triangular shape, or other acceptable shape, to couple an auxiliary unit to the main display panel 10. Also, the coupling groove 14 has a width W1 of its opening which is formed at an outermost portion of the top and sides of the perimeter of the main display panel 10. The width W1 of the opening of the coupling groove 14 is less than a width W2 of its interior. At least one connector 33, which may be a cylindrical connector, which has a size and shape corresponding to the coupling groove 14, is attached to the sub display panel 30 and the memo clip 40, respectively, such that the at least one connector 33 can be coupled within the coupling groove 14, which thereby couples, respectively, the sub display panel 30 and the memo clip 40 to the main display panel 10 within the coupling groove 14.

The case 12 may include a front plate 12a and a rear plate 12b. The case 12 may further include a middle portion 12c formed between the front plate 12a and the rear plate 12b. It is possible that the middle portion 12c is an extension of one of the front plate 12a and the rear plate 12b to be coupled to the other one of the front plate 12a and the rear plate 12b. The middle portion 12c may have coupling groove 14.

Since the coupling groove 14 of the middle portion 12c is formed after the case 12 is assembled and/or the front plate 12a and the rear plate 12b are coupled to form the case 12, the one or more units can be coupled to the case 12 without assembling or disassembling the case 12.

Since the case 12 include an entrance/exit portion 14a formed in the coupling groove 14 of the middle portion 12c, the auxiliary unit can be inserted into the coupling groove 14 through the entrance/exit portion 14a without considering a coupling/decoupling process of the auxiliary unit to/from the case 12 before an assembling process of the case 12 or after disassembling the case 12. The entrance/exit portion 14a can be formed at a position where adjacent coupling grooves 14, for example, the coupling grooves 14 on top and side of the case 12 are met as illustrated in FIG. 1.

The auxiliary unit may not be connected to an inside structure of the case 12. However, it is possible that an electrical connector (or cable) 50 can be connected between a circuit unit 15 disposed inside of the case 12 of the main display panel 10 to control at least one of the main display panel 10, the auxiliary unit, and control buttons 35 and 36, and a circuit unit 35 disposed inside the auxiliary unit to control at least one of the main display panel 10, the auxiliary unit, and the control buttons 35 and 36 through a main terminal 51 formed on a portion of the case 12 (or rear plate 12b) and an auxiliary terminal 52 formed on a portion of the auxiliary unit. The control buttons 35 and 36 are connected to the circuit unit 15 and the circuit unit 35, respectively. It is possible that the auxiliary unit may have a wireless communication unit of the circuit unit 35 to communicate with a wireless communication unit of the circuit unit 15 of the main display panel 10.

As illustrated in FIGS. 2 and 3, the connector 33 of the sub display panel 30 is disposed at an outer edge of a side of the sub display panel 30 such that the connector 33 extends along the edge of the sub display panel 30. The connector 33 may be integrated with the case 32 of the sub display panel 30, or may be attached thereto. The connector 33 of the memo clip 40 may have the same shape as the connector 33 of the sub display panel 30.

When a user wishes to mount the sub display panel 30 or the memo clip 40 to the main display panel 10, as illustrated in FIG. 2, the user simply slides the respective connector 33 into the coupling groove 14 at an upper corner of the main display panel 10. After the connector 33 is coupled within the coupling groove 14, the connector 33 is prevented from being separated from the coupling groove 14, as illustrated in FIG. 3, because, as described above, the opening width W4 of the coupling groove 14 is less than the interior width W2 of the coupling groove 14. A predetermined frictional force may be applied to the inner surface of the coupling groove 14, or the outer surface of the connector 33, such that the sub display panel 30 or the memo clip 40 does not move from a stationary coupling position unless an external force is applied by a user to the sub display panel 30 or the memo clip 40 to overcome the frictional force. This prevents the auxiliary units from rotating, or otherwise moving, from their respective stationary coupling position unless a user intends to reposition a respective auxiliary unit. To this end, the connector 33 may be slightly forcibly fitted into the coupling groove 14, or rubber, silicone, or other suitable material having a high frictional force, may be coated on the inner surface of the coupling groove 14 or the outer surface of the connector 33.

The sub display panel 30 or the memo clip 40 may be freely mounted by a user to the top or either side of the main display panel 10, as needed. After the sub display panel 30 or the memo clip 40 is mounted to the top or either side of the main display panel 10, the connector 33 can be moved linearly along the coupling groove 14 using a sliding motion. Consequently, it is possible for a user to push, slide and move the connector 33 to a desired position. Also, as illustrated in FIG. 3 and described above, the coupling groove 14 may be formed in the sectional shape of an arc, and the connector 33 may be correspondingly formed in the shape of a cylinder to move within the arc-shaped coupling groove 14. Consequently, it is possible for the user to easily adjust the screen angle of the sub display panel 30 while the sub display panel 30 is mounted to the main display panel 10 by rotating or sliding the respective display panel to a desired position.

FIG. 1 illustrates only the sub display panel 30 and/or the memo clip 40 as the auxiliary unit mounted to the main display panel 10, however, the auxiliary unit is not limited to being the sub display panel 30 and/or the memo clip 40. Furthermore, as described above, any suitable connector may be used as the connector 33, so long as the connector can be coupled within the coupling groove 14. Also, FIG. 1 illustrates that the coupling groove 14 is formed in the sectional shape of an arc, and the connector 33 is formed in the shape of a cylinder; however, in addition to the description above, the coupling groove 14 and the connector 33 may be formed in the sectional shape of a polygon having, for example, 6 or more sides. In this example, in order to rotate the connector 33 to a new angular position, the connector 33 is completely separated from the coupling groove, by sliding it, and is then reinserted into the coupling groove in a desired angular position, to adjust the screen angle of the sub display panel 30 and/or the memo clip 40.

The sub display panel 30 may be connected to the main display panel 10 or an additional power supply unit via a power cable (not illustrated) such that the sub display panel 30 is provided with electrical power. Also, the sub display panel 30 may be connected to the main display panel 10 and/or an additional image signal transmitter (not illustrated), such as an external computer, via a signal cable or a wireless connection (not illustrated) such that an image provided by the main display panel 10 and/or the additional image signal transmitter is displayed on the sub display panel 30. A wireless receiver (not illustrated) may be mounted in the sub display panel 30 to receive an image via the wireless connection such that an image can be displayed on the sub display panel 30 without the need of a connection to a signal cable.

When the main display panel 10 and the sub display panel 30 are used while the main display panel 10 and the sub display panel 30 are connected to a computer, a message, a dictionary, or an image, such as an electronic photo album, may be displayed on the sub display panel 30, to increase a user's convenience. Of course, the sub display panel 30 may also be used while the sub display panel 30 is separated from the main display panel 10.

FIGS. 4 through 7 illustrate a display device 100 according to an embodiment of the present general inventive concept. The present embodiment is characterized by the shape of a coupling unit to couple an auxiliary unit, such as a sub display panel 130 or a memo clip 140. Specifically, the coupling unit includes a first coupling groove 114 formed at the edge of the top and both sides of an outer perimeter of a main display panel 110, a second coupling groove 134 formed at the edge of each side of an outer perimeter of the display panel 130, and a connection member 150, which may have a bar shape, attached to the first and second coupling grooves 114 and 134.

The first coupling groove 114 extends along the edge of at least one side of the main display panel 110. The first coupling groove 114 may be formed in the sectional shape of an arc.

Similarly, the second coupling groove 134 extends along the edge of at least one side of the sub display panel 130. The second coupling groove 134 is formed in the sectional shape of an arc. The connection member 150 may be formed in the shape of a cylinder having an outer surface curvature corresponding to the inner surfaces of the first and second coupling grooves 114 and 134.

Figure 6:
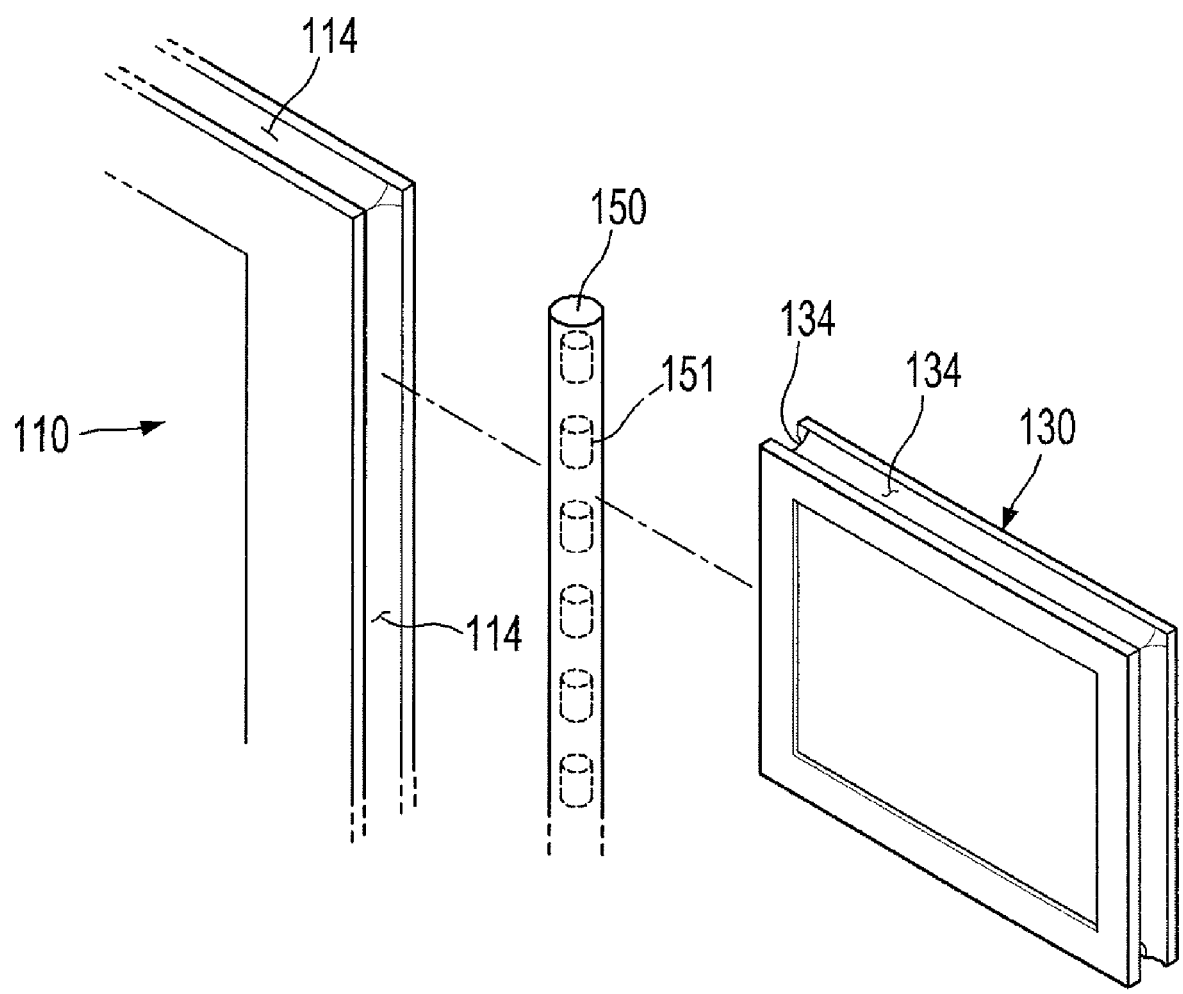
FIG. 6 is a perspective view illustrating coupling between the main display panel and the sub display panel of the display device according to an embodiment of the present general inventive concept.
Figure 7:
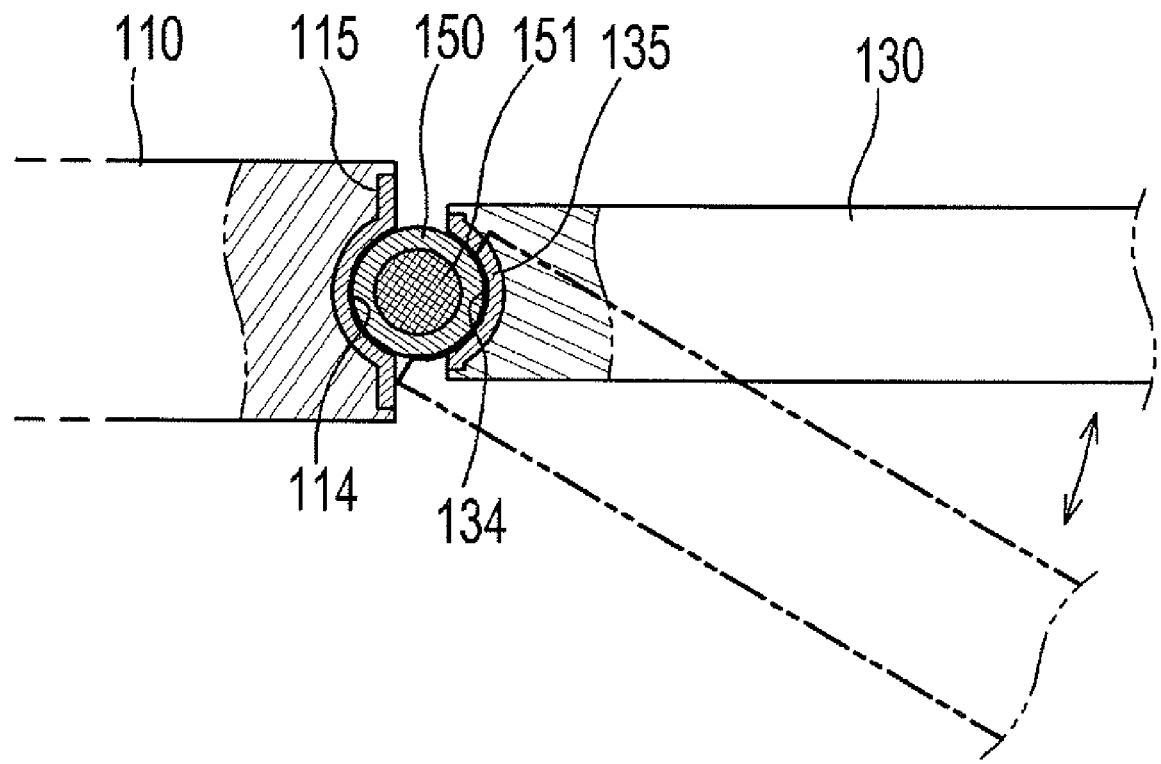
FIG. 7 is a sectional view taken along line VII-VII' of the display device of FIG. 5.

As illustrated in FIG. 6, the connection member 150 may includes a plurality of magnets 151 embedded therein. Referring to FIG. 7, a first magnetic member 115 may be mounted to the first coupling groove 114 of the main display panel 110, and a second magnetic member 135 may be mounted to the second coupling groove 134 of the sub display panel 130, such that the connection member 150 can be attached to the first coupling groove 114 and the second coupling groove 134. Consequently, the diametrically opposite sides of the connection member 150 are respectively attached to the first and second coupling grooves 114 and 134, whereby the sub display panel 130 is easily mounted to the main display panel 110 by magnetically attaching it to the connection member 150 which is also magnetically attached to the main display panel 110.

Figure 4:
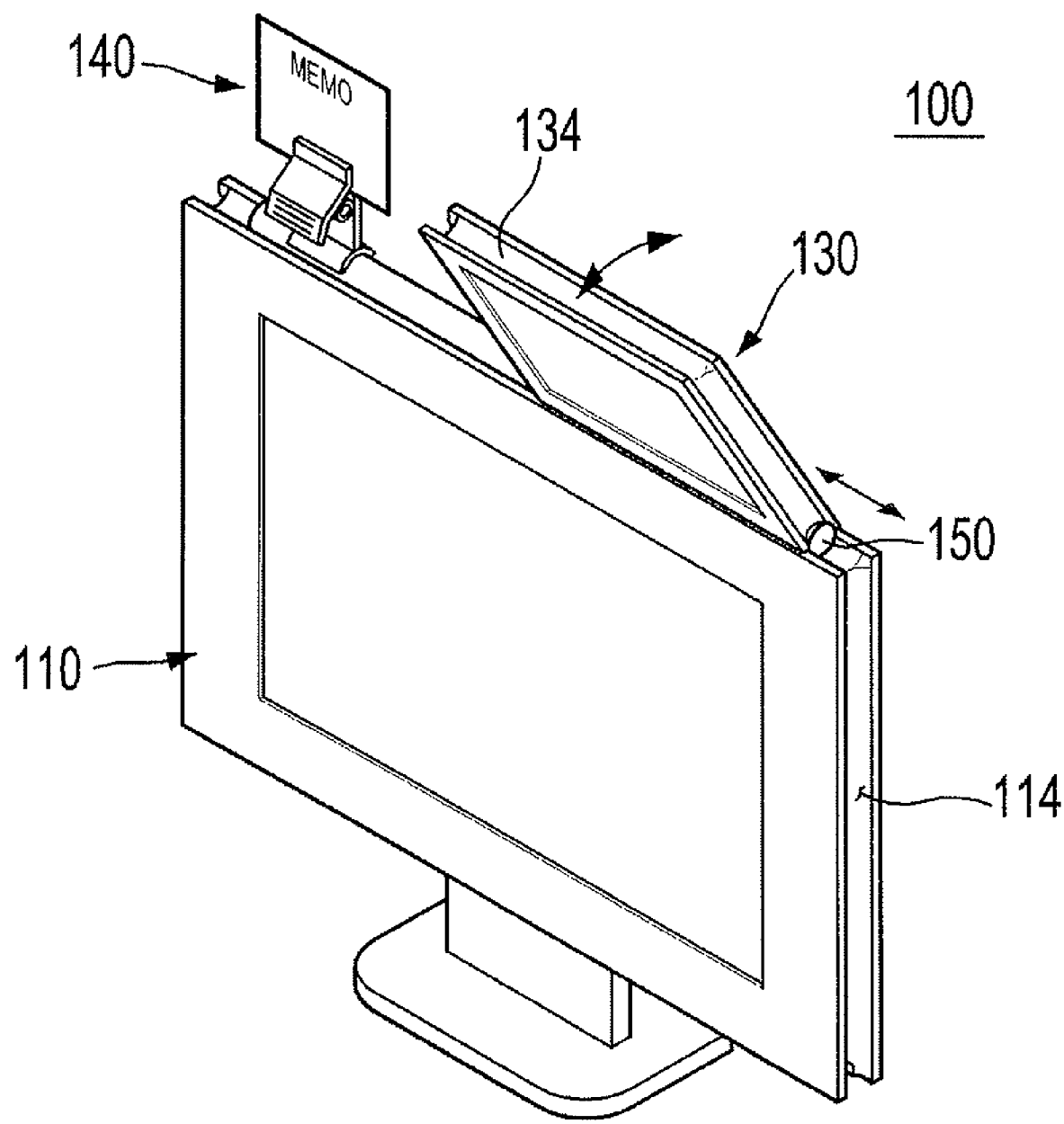
FIG. 4 is a perspective view illustrating a display device, according to an embodiment of the present general inventive concept, wherein a sub display panel is mounted to the top of a main display panel.
Figure 5:
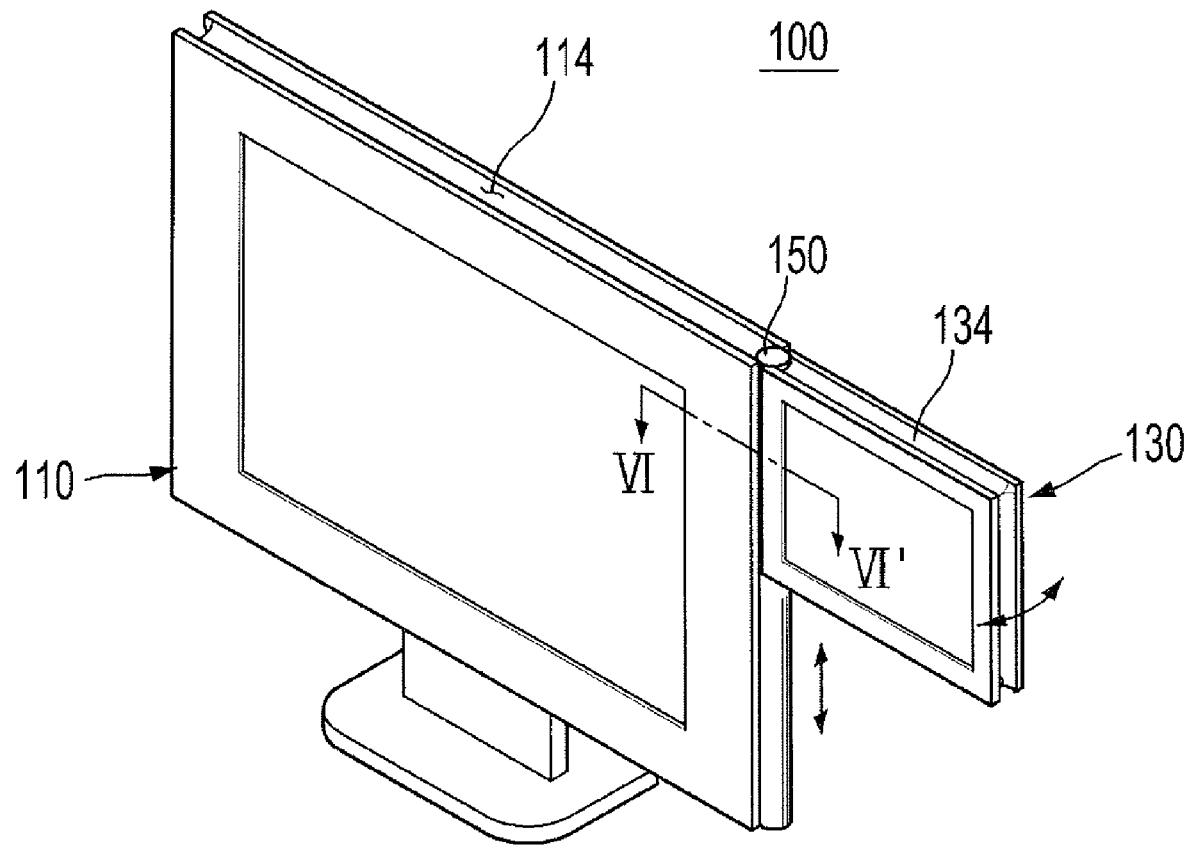
FIG. 5 is a perspective view illustrating a display device, according to an embodiment of the present general inventive concept, wherein the sub display panel is mounted to the side of the main display panel.

As illustrated in FIG. 4, the connection member 150 may be mounted to the top of the main display panel 110 such that the sub display panel 130 can be mounted to the top of the main display panel 110. Also, as illustrated in FIG. 5, the connection member 150 may be mounted to the side of the main display panel 110 such that the sub display panel 130 can be mounted to the side of the main display panel 110. It is possible for a user to push, slide and move the sub display panel 130 in the longitudinal direction of the connection member 150, while the sub display panel 130 is mounted to the main display panel 110, and therefore, it is possible to easily change the position of the sub display panel 130. The sub display panel 130 may also be rotated on the connection member 150 to change the angular position of the sub display panel 130.

As illustrated in FIG. 7, the first coupling groove 114 and the second coupling groove 134 each have a depth less than the radius of the connection member 150. Consequently, when the sub display panel 130 is mounted to the main display panel 110 via the connection member 150, the edge of the main display panel 110 may be spaced slightly apart from the edge of the sub display panel 130. This gap allows the rotation of the sub display panel 130 and thus easy adjustment by a user of the screen angle of the sub display panel 130 is accomplished.

FIG. 7 illustrates that the magnets 151 may be embedded in the connection member 150, and the first and second magnetic members 115 and 135 are mounted to the first and second coupling grooves 114 and 134, respectively; however, in another embodiment, magnets may be mounted to the first and second coupling grooves 114 and 134, and a magnetic member may be embedded in the connection member 150. Also, the connection member 150 may be formed in the sectional shape of a polygon, and the first and second coupling grooves 114 and 134 may be polygonal grooves corresponding to the polygonal connection member 150. When a polygonal shape for the first and second coupling grooves 114 and 134 and the connection member 150, in order for a user to change the angular position of the respective auxiliary unit, the user separates the respective auxiliary unit from the connection member, and then reattaches it to achieve a different angular position of the auxiliary unit. When the sub display panel 130 is not in use, it is possible to easily separate the sub display panel 130 from the main display panel 110 by separating the connection member 150 from the first coupling groove 114 of the main display panel 110.

As apparent from the above description, the display device according to the present general inventive concept is disposed in a structure in which a connector is fitted within a coupling groove formed at the edge of at least one side of the display panel or in a structure in which a connection member, having magnets embedded therein, is attached to the coupling groove of the display panel. Consequently, the present general inventive concept has the effect allowing a user to easily mount or separate an auxiliary unit, such as a sub display panel or a memo clip, to or from the display panel.

Also, the coupling groove of the display panel may extend along the top and side edges of the outer perimeter of the display panel. Consequently, the present general inventive concept has the effect of allowing a user to easily move an auxiliary unit, such as the sub display panel or the memo clip, to a desired position, as needed.

Furthermore, the sub display panel can be rotated by a predetermined angle while the sub display panel is mounted to the main display panel. Consequently, the present general inventive concept has the effect of allowing a user to easily adjust the screen angle of the sub display panel.

Although a few embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A display device, comprising:
   a display panel;
   a support unit to support the display panel;
   at least one coupling groove formed at an edge of the display panel to allow at least one auxiliary unit to be mounted to or separated from the display panel; and
   a connection member formed at an edge of the at least one auxiliary unit and inserted into the at least one coupling groove.

2. The display device of claim 1, wherein the coupling groove extends along the edge of the display panel such that the auxiliary unit can move in a longitudinal direction, and the coupling groove has an opening width less than an interior width.

3. The display device of claim 2, wherein the coupling groove is formed in the sectional shape of an arc.

4. A display device, comprising:
   a display panel;
   a support unit to support the display panel; and
   at least one coupling groove formed at an edge of the display panel to allow at least one auxiliary unit to be mounted to or separated from the display panel,
   wherein the coupling groove extends along top and side edges of the display panel such that the auxiliary unit can move in a longitudinal direction; and
   the display device further comprises:
      a connection member having at least one magnet embedded therein, the connection member being attached to the coupling groove, and
      a magnetic member mounted to the edge of the display panel such that the connection member can be attached to the display panel via the magnetic member.

5. The display device of claim 4, wherein:
   the coupling groove is formed in a sectional shape of an arc, and the connection member is formed in a shape of a cylinder;

the auxiliary unit is mounted to the display panel such that an angular position of the auxiliary unit can be adjusted.

6. The display device of claim 5, wherein the connection member is integrally formed at an edge of the at least one auxiliary unit.

7. A display device, comprising:
a main display panel;
a support unit to support the main display panel;
a sub display panel mounted to an edge of the main display panel; and
a coupling unit to allow the sub display panel to be coupled to the main display panel, such that the sub display panel can move and an angular position of the sub display panel can be adjusted, and to allow the sub display panel to be separated from the main display panel,
wherein the coupling unit includes at least one coupling groove formed at least one edge of the main display panel and a connector provided at the at least one edge of the sub display panel such that the connector is fitted within the coupling groove.

8. The display device of claim 7, wherein
the coupling groove extends along top and side edges of the main display panel, the coupling groove having an opening width less than an interior width, and
the connector is formed having an external shape corresponding to a shape of the coupling groove, the connector extending along an edge of the sub display panel such that the sub display panel can move in a longitudinal direction of the coupling groove.

9. The display device of claim 8, wherein the coupling groove is formed in a sectional shape of an arc, and the connector is formed in a shape of a cylinder.

10. A display device, comprising:
a main display panel;
a support unit to support the main display panel;
a sub display panel mounted to an edge of the main display panel; and
a coupling unit to allow the sub display panel to be coupled to and separated from the main display panel, wherein
the coupling unit includes a first coupling groove extending along the edge of the main display panel, a second coupling groove extending along an edge of the sub display panel, and at least one connection member coupled to the first and second coupling grooves by a magnetic force.

11. The display device of claim 10, further comprising:
a connection member having at least one magnet embedded therein; and
a magnetic member mounted to the first and second coupling grooves, whereby the connection member is coupled to the first and second coupling grooves.

12. The display device of claim 11, wherein the connection member is formed in a shape of a cylinder, and the first and second coupling grooves each have a curved surface corresponding to a shape of an outer surface of the connection member.

13. The display device of claim 12, wherein at least one of the first and second coupling grooves has a depth less than the radius of the connection member.

14. A display device comprising:
a display panel having an edge that extends along an edge axis; and
a coupling groove having a back surface formed on the edge of the display panel and extending along the edge axis to be coupled to a connector of an external auxiliary unit that is inserted into the coupling groove in the direction of the edge axis;
a first circuit disposed in the display panel;
a second circuit disposed in the external auxiliary unit; and
a connector to connect the first circuit and the second circuit.

15. The display device of claim 14, wherein the coupling groove is formed on an exterior surface of the display panel.

16. The display device of claim 14, further comprising:
an entrance and/or exit portion formed in the coupling groove such that the external auxiliary unit is coupled to or decoupled from the display panel through the entrance and/or exit portion.

17. A display device, comprising:
a main display panel having an outer portion that extends along an edge axis; and
an auxiliary unit magnetically and rotatably coupled to the outer portion of the perimeter of the main display panel to rotate about the edge axis and move linearly along the outer portion of the perimeter of the main display panel in the direction of the edge axis.

18. A display device, comprising:
a first display panel having an outer edge extending along an edge axis and including a groove formed in the outer edge and extending along the edge axis, the groove having a back surface that forms a sectional shape of an arc and that extends along the outer edge in the direction of the edge axis; and
a second display panel having a connector that is inserted into the groove to slide against the back surface in the direction of the edge axis, the connector being rotatable within the groove about the edge axis to rotate the second display panel with respect to the first display panel about the edge axis.

* * * * *